United States Patent [19]

Anderson et al.

[11] Patent Number: 4,977,934
[45] Date of Patent: Dec. 18, 1990

[54] MULTIPLE WIRE STRAIGHTENER MODULE FOR AN AUTOMATED CABLE ASSEMBLY SYSTEM

[75] Inventors: Carl R. Anderson, Arvada; Gary G. Seaman, Broomfield, both of Colo.

[73] Assignee: AT&T Bell Laboratories, Murray Hill, N.J.

[21] Appl. No.: 485,684

[22] Filed: Feb. 27, 1990

[51] Int. Cl.⁵ ............................ B21F 1/02; B21D 3/00
[52] U.S. Cl. ................................... 140/147; 140/139; 72/160; 29/825; 29/857; 425/383; 264/280; 264/339
[58] Field of Search ............... 140/139, 140, 147, 149; 72/79, 160, 303; 57/311; 425/383, 392; 29/33 F, 34 D, 825, 857, 828; 264/280, 281, 285, 320, 339

[56] References Cited

U.S. PATENT DOCUMENTS

| | | | |
|---|---|---|---|
| 149,666 | 4/1874 | Mallett | 72/79 |
| 1,666,134 | 4/1928 | Griswold et al. | 140/140 |
| 2,228,745 | 1/1941 | Berkebil | 140/147 |
| 2,791,243 | 5/1957 | Paulson | 72/79 |
| 2,922,460 | 1/1960 | Schwendenwein | 140/139 |
| 3,270,542 | 9/1966 | Kennedy | 72/160 |
| 3,285,047 | 11/1966 | Crawford | 72/79 |
| 3,847,190 | 11/1974 | Forester | 140/149 |

FOREIGN PATENT DOCUMENTS

| | | | |
|---|---|---|---|
| 1478265 | 3/1967 | France | 72/79 |
| 94742 | 7/1980 | Japan | 140/147 |
| 133942 | 7/1985 | Japan | 140/147 |
| 980904 | 12/1982 | U.S.S.R. | 140/147 |

Primary Examiner—Robert L. Spruill
Attorney, Agent, or Firm—John C. Moran

[57] ABSTRACT

A compact wire straightener module having a plurality of curved tubes for simultaneously straightening a large number of wires. Each tube bends its wire in a first plane and then bends the wire in a second plane perpendicular to the first plane. The wires are not pulled through the wire straightener module; but rather, after one end the wires has been secured, the wire straightener module moves in a horizontal direction along the wires to perform the straightening operation. This movement of the wire straightener module allows for use in a compact automatic cable assembly by eliminating the need for a separate mechanism to pull the wires through the wire straightener module. Further, each tube is a continuous assembly so that threading wire through the module is simple and fast.

19 Claims, 7 Drawing Sheets

MULTIPLE WIRE STRAIGHTENER MODULE FOR AN AUTOMATED CABLE ASSEMBLY SYSTEM

TECHNICAL FIELD

The present invention relates to an automated cable assembly system and, more particularly, to a module of wire straighteners used to straighten wires during the operation of the automated cable assembly system.

BACKGROUND OF THE INVENTION

In the prior art, wire straighteners have been either of the roller type or the rotary die type. U.S. Pat. No. 4,464,919 discloses a wire straightener of the roller type having banks of wire-guiding rollers. Each bank includes at least three rollers, all aligned in a common plane. The banks of rollers are arranged in an angular position to each other, and wire is straightened by being pulled through the banks. U.S. Pat. No. 4,177,843 discloses a wire straightener of the rotary die type. In this type of straightener, wire straightener dies are arranged in sequence and are offset from each other in a rotating wire straightening arbor. Each die consists of a short straight tube which is beveled at each end to allow the threading of wire through the die. The arbor is rotated as the wire is pulled through the die to straighten the wire.

Both the roller and rotary die wire straighteners perform the function of straighting wire but have two problems. The first problem is that both types of straighteners require a large amount of space to function. In general, this has not proven a serious problem when the wire was being used in single stage manual or semi-automatic processes where the product of a stage was manually transferred to the next production stage. However, in a fully automated cable assembly system, the wire straighteners must be implemented in a small space, and the prior art straighteners exceed the amount space available. The second problem is the difficulty and time involved to thread the wire through either the rollers or the dies. This second problem is particularly important if a large number of wires are being straightened, since it is difficult to manipulate a large number of wires in a limited space. These two problems make the roller or rotary die wire straighteners impractical in an automated cable assembly system where only a small amount of space can be occupied by wire straighteners for a large number of wires.

SUMMARY OF THE INVENTION

The aforementioned problems are solved and a departure in the art is achieved by a compact straightener module having a plurality of curved channels for simultaneously straightening a large number of elongated cylindrical or rectangular members such as wires, fibers, filaments or tubing. As members are transferred through the channels, each channel of the straightener module bends its member in a first plane and then bends the member in a second plane perpendicular to the first plane. Each channel is a continuous assembly so that threading the member through the module is simple and fast.

Advantageously, the members are not pulled through the straightener module; but rather, after one end of the members has been secured, the straightener module moves along the members to perform a straightening operation. This movement of the straightener module makes it ideal for use in a compact automatic cable assembly system by eliminating the need for a separate mechanism to pull the members through the straightener module.

In one specific embodiment application of a straightener module in an automatic cable assembly system which fabricates cables from wires, the straightener module is mounted on a movable platform along with a wire gripper and wire positioner. The channels are individual tubes secured within the straightener module. Wire is supplied by reel of wires with each wire first being threaded through the straightener module, then through the wire gripper, and finally through the wire positioner. During operation of the automatic cable assembly system, the wire gripper grips the wires when actuated, and the platform is moved to a connectorizing mechanism which attaches the wires to a connector. With the connector securing the wires and the wire gripper releasing the wires, the platform is moved away from the connectorizing mechanism pulling the attached wires through the straightener module. The wire gripper uses a pair of teeth and a pair of indents to grip each wire. Groups of teeth and indents are separately actuated to allow different groups of wires to be gripped. This capability is used by the assembly system to attached varying numbers of wires to different connectors by having the wire gripper continue to grip unattached wires when the platform is moved away from the connectorizing mechanism. This capability allows fabrication of cable assemblies having multiple connectors with each connector having a different number of attached wires.

BRIEF DESCRIPTION OF THE DRAWING

FIG. 10 illustrates a portion of the wire straightener of FIG. 5.

DETAILED DESCRIPTION

Figure 1:
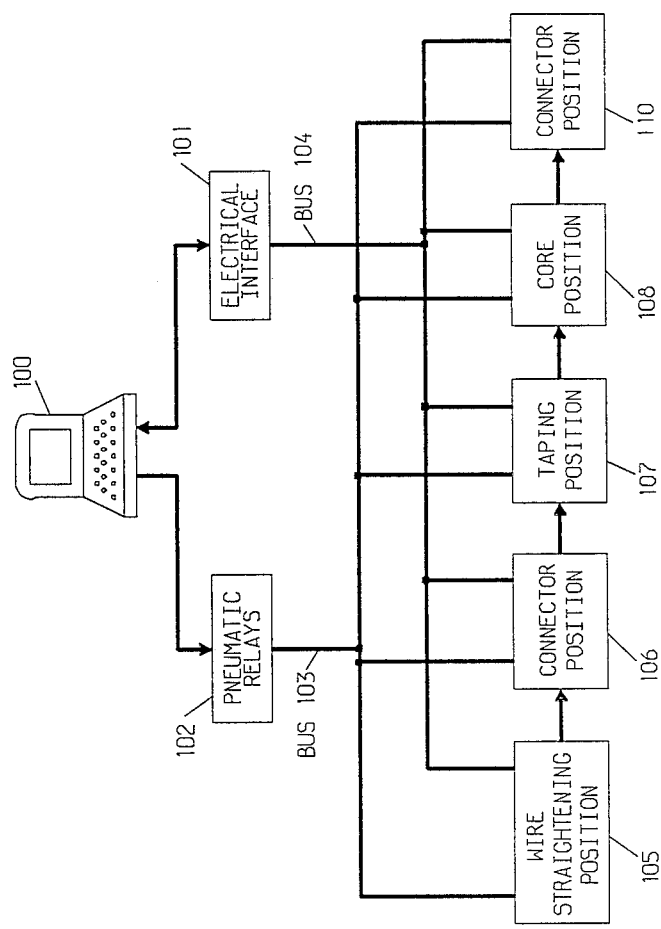
FIG. 1 illustrates, in block diagram form, an automatic cable assembly system utilizing the present invention.

FIG. 1 illustrates, in block diagram form, automatic cable assembly system 112 including wire straightener position 105 which utilizes the present invention. Although position 105 is being utilized to straighten wire, one skilled in the art could readily adapt position 105 to straighten other elongated cylindrical or rectangular members. The automated cable assembly system illustrated in FIG. 1 is a continuous system because there is always one cable assembly taking place at each of the designated positions. System 112 produces illustratively an electrical cable of 38 centimeters consisting of 50 wires, and the wires are illustratively 26 gauge wires. One end of the cable is terminated by two connectors (one connector terminates 26 wires and the other connector terminates 24 wires). The other end of the cable is terminated by one connector. In addition in the middle, the cable is looped through a ferrite core. The purpose of the ferrite core is to prevent electromagnetic interference from propagating through the cable.

Automatic cable assembly system 112 functions in the following manner. First, wire straightener position 105 straightens the 50 wires in a two-step process for the cable so that connector position 106 can attach two connectors to one end. Wire straightener position 105 performs its function in the very limit space of approximately 50 linear centimeters. Not only is it essential that the wires be straight for connector position 106 but also that other end of the cable is free of unacceptable bending. The other end is subsequentially formed into a circular bundle and taped by taping position 107.

Connector position 106 attaches 24 wires to a first connector and then attaches 26 wires to a second connector. Further details on position 106 are given with respect to FIG. 2. After the two connectors are attached to the cable by connector position 106, the cable and connectors are then automatically transferred to taping position 107. The automatic transfer is accomplished by a mechanism that attaches to the two connectors of the cable.

At taping position 107, a piece of masking tape is wrapped around the unconnectorized end of the cable in such a manner that the wires of this end are formed into a substantially circular bundle. It is necessary to tape the very end of the cable so that core position 108 can easily thread this end through the ferrite core. To accomplish this taping, first the wires of the unconnectorized cable end are formed into a circular bundle by a gathering mechanism. Then a piece of masking tape is attached to the top of this bundle at the very end of the cable. A mechanism is then placed over the taped end, and rotated so as to wrap the tape around the end of the cable.

At core position 108, an Adept Model Number 440 robotic arm first picks up a ferrite core having an inner diameter of approximately 1.3 centimeters and then threads the unconnectorized end of the cable through the core. The robotic arm sets the core down, grasps the unconnectorized end, brings the unconnectorized end back around, and inserts the unconnectorized end through the core thus looping the cable through the core. After the cable has been looped through the ferrite core, the cable is then automatically transferred to connection position 110.

At connector position 110, the wires of the unconnectorized end are mechanically sorted into two columns of wires in the correct sequential order with respect to connection of the wires to the first and second connectors. For sorting, the wires are identified by plugging the first and second connectors into an electric circuit which identifies each wire with respect to its connection on these connectors. U.S. Pat. No. 4,107,838 discloses an apparatus for performing this sorting. Once the wires have been sorted into two columns, connector position 110 attaches these wires onto a single connector.

Figure 2:
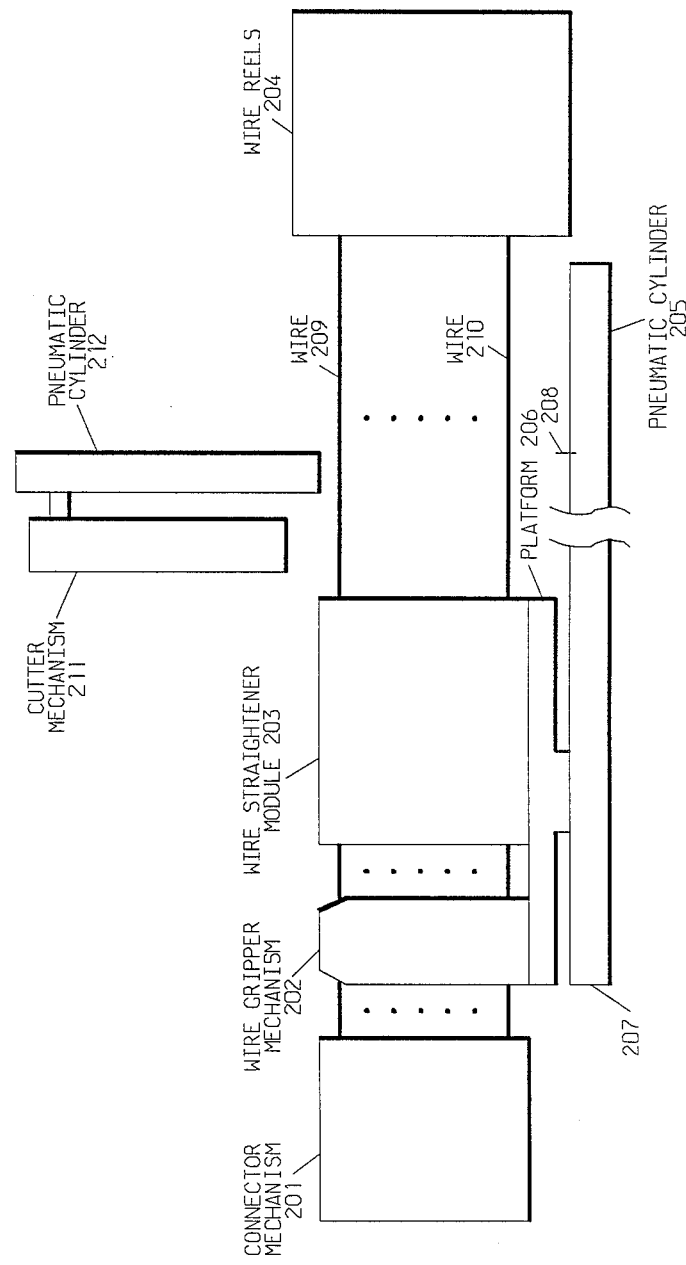
FIG. 2 illustrates in greater detail the apparatus for attaching connectors and for performing wire straightening which is the subject of the present invention.
Figure 3:
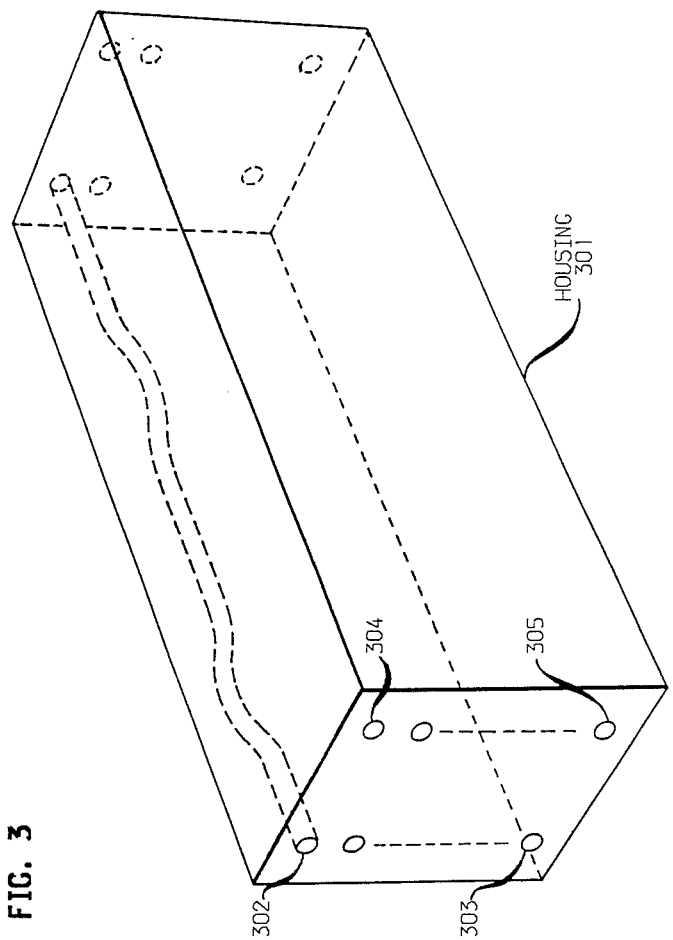
FIG. 3 illustrates, in greater detail, a wire straightener module.

FIG. 2 illustrates the operation of positions 105 and 106 in greater detail. Wire straightener module 203 which is the subject of this invention is illustrated in FIG. 2 and in greater detail in FIGS. 3, 4, and 5. Wire gripper mechanism 202 and wire straightener module 203 are rigidly fixed to platform 206. Pneumatic cylinder 205 controls the horizontal movement of platform 206. Not illustrated in FIG. 2 are dual rails mounted on either side of platform 206 which support the platform as it is moved under control of pneumatic cylinder 205 in a horizontal plane from left to right in FIG. 2. One skilled in the art could readily devise such dual rails for the apparatus of FIG. 2. The operation of wire straightener module 203 can be best illustrated by considering the following sequence of operations performed by the apparatus illustrated in FIG. 2. Assume that the left edge of platform 206 is at position 207 on pneumatic cylinder 205 as illustrated in FIG. 2 and that the first connector is being attached. Wires 209 through 210 are arranged in two columns with each column having thirteen wires. In position 207, connector mechanism 201 attaches the bottom 24 wires of wires 209 through 210 onto the first connector. After connector mechanism 201 has attached 24 wires to the first connector, wire gripper mechanism 202 releases its pressure on the 24 wires attached to the first connector but retains pressure on the top wire of each column. Pneumatic cylinder 205 under control of computer 100 via pneumatic relays 102 transfers platform 206 so that the left edge of the latter platform is at position 208. During the horizontal movement of wire straightener module 203 along the attached wires, individual wires are passed through the tubes of wire straightener module 203 as illustrated in FIG. 3. As wires pass through these tubes, the wires are straightened as will be described in greater detail with respect to one tube. The top wire of each column is held by wire gripper mechanism 202 and is transferred back towards wire reels 204. These top wires are not passed through the tubes of wire straightener module 203 during this operational phase.

After platform 206 has reached point 208, the wires have been straightened. Pneumatic cylinder 212 under control of computer 100 positions cutter mechanism 211 so that the latter mechanism straddles the two columns of wires. Note, that the structure which supports cutter mechanism 211 is not illustrated in FIG. 2, but is described with respect to FIG. 9. Cutter mechanism 211 consists of two blades which in the open position straddle either side of the two columns of wires. Not illustrated in FIG. 2 are the pneumatic solenoids which when actuated by computer 100 and pneumatic relays 102 close the two blades and sever the bottom 24 wires of wires 209 through 210. At this point in time, a mechanism not illustrated in FIG. 2 removes the first connector from connector mechanism 201 and transfers it to a holding point along with the attached wires.

In the next sequence of operation, wire gripper mechanism 202 grips the wires under control of computer 100, and then pneumatic cylinder 205 transfers platform 206 back to point 207. As these actions take place new wire for the bottom 24 wires is pulled from wire reels 204. Connector mechanism 201 now attaches a second connector onto all 26 wires which are presented to connector mechanism 201 from wire gripper mechanism 202. After the wires are attached to the second connector, wire gripper mechanism 202 releases the tension on all wires, and pneumatic cylinder 205 transfers platform 206 back to position 208. As platform 206 is transferred back, all of the wires are straightened by module 203.

At this point in time, cutter mechanism 211 is activated to sever all 26 wires connected to the second connector after being lowered into position by pneumatic cylinder 212. The second connector along with attached wires is then transferred to the holding position with the first connector and its attached wires. These two connectors with attached wires are then transferred to taping position 107 where all the wires of both connectors are wrapped with masking tape at the unconnectorized end.

FIG. 3 illustrates wire straightener module 203. Module 203 consists of housing 301 which secures two columns of tubes with each column having thirteen tubes. The first column consists of tubes 302 through 303, and the second column consists of tubes 304 through 305. Only tube 302 is illustrated in housing 301 in FIG. 3 for clarity. Wires 209 through 210 of FIG. 2 are threaded through these tubes to form the columns of wires illustrated in FIG. 2.

Figure 4:
FIGS. 4 and 5 illustrate a wire straightening tube of a wire straightener module.
Figure 5:

Tube 302 is illustrated in FIGS. 4 and 5, and the other tubes in housing 301 are the same. Advantageously for 26 gauge, copper wire with insulation, tube 302 is approximately 14 centimeters in length, has an outer diameter of approximately 0.32 centimeter, and has an inner diameter of approximately 0.1 centimeter. As tube 302 is moved along a stationary wire, the wire is bent in one plane and then, is bent in a second plane which is perpendicular to the first plane. This bending procedure straightens the wire. FIG. 10 illustrates, in greater detail, the arcs for one plane through which a wire is bent. FIG. 10 corresponds to FIG. 5. Tube 302 is first bent in an approximately 11 degree arc away from centerline 1001 as indicated by circle 1002, then bent in an approximately 22 degree arc toward centerline 1001 as indicated by circle 1003, and finally bent into alignment with centerline 1001 by an approximately 11 degree arc as indicated by circle 1004. Circles 1002, 1003, and 1004 each has a diameter equal to approximately 2.54 centimeters. Dimensions 1005 through 1008 are approximately 3.81, 1.905, 1.905, and 2.489 centimeters, respectively. The other bent portion of tube 302 is identical to the bent portion illustrated in FIG. 10.

Figure 6:
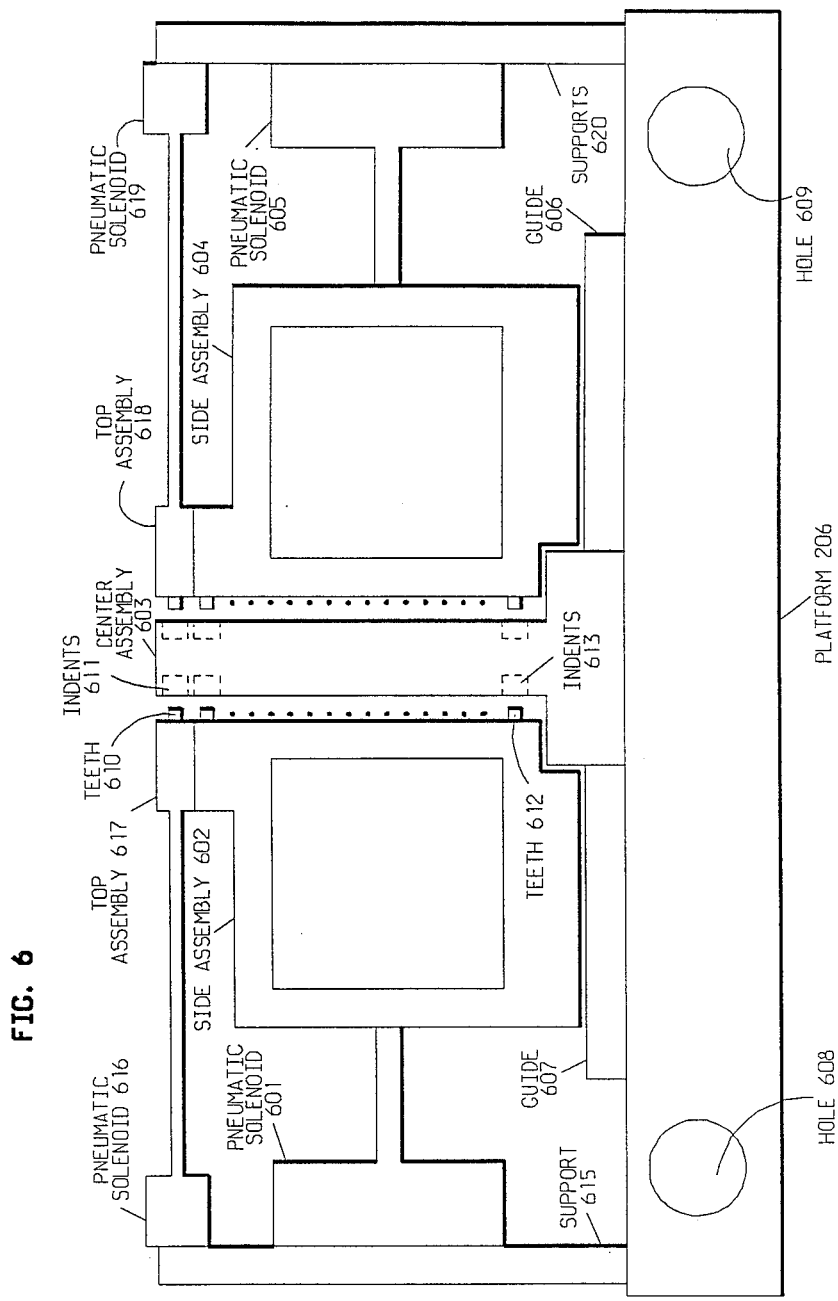
FIG. 6 illustrates in greater detail a wire gripper.
Figure 7:
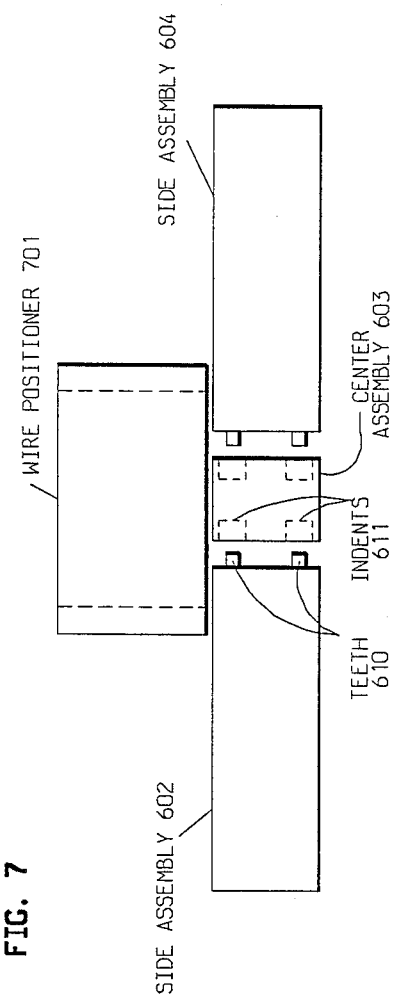
FIG. 7 illustrates a top view of a wire gripper and a wire positioner.

Wire gripper mechanism 202 of FIG. 2 comprises gripper 600 illustrated in FIG. 6 and wire positioner 701 illustrated in FIG. 7. Also illustrated in FIG. 6 is a front view of platform 206 of FIG. 2. This front view of platform 206 illustrates holes 608 and 609 through which the dual rails are inserted as previously mentioned with respect to FIG. 2. These dual rails form the support for platform 206. The two columns of wires illustrated in FIG. 2 are positioned on either side of center assembly 603. Each wire is positioned between a pair of teeth and a pair of indents (e.g., teeth 610 and indents 611). The wires are held in vertical position by wire positioner 701 as will be described in greater detail with respect to FIG. 8. Center assembly 603 is rigidly secured on platform 206. Side assemblies 602 and 604 move in a horizontal direction on guides 607 and 606, respectively. The movement of side assemblies 602 and 604 is controlled by pneumatic solenoids 601 and 605, respectively. Similarly, top assemblies 617 and 618 move in a horizontal direction under control of pneumatic solenoids 616 and 619, respectively. Top assemblies 617 and 618 move on guides which are an integral part of side assemblies 602 and 604, respectively. The solenoids are rigidly secured to platform 206 by supports 615 and 620.

FIG. 7 illustrates the configuration of teeth 610 and indents 611. The other teeth and indents are the same. In FIG. 6, when pneumatic solenoid 616 pushes top assembly 617 against center assembly 603, the wire is pushed by teeth 610 into indents 611. In this position, the wire is firmly gripped by top assembly 617 and center assembly 603. The other teeth and indents function in the same manner but are under control of different solenoids. For 26 gauge wire, each tooth extends approximately 0.1 of a centimeter from the side assembly and is approximately 0.1 of a centimeter square. Each indent is approximately 0.2 centimeters wide and approximately 0.1 centimeter deep and slightly over 0.1 centimeter in height. When solenoids 601, 605, 616 and 619 are deactivated, internal springs in the solenoids pull the attached assemblies away from center assembly 603. For example, when pneumatic solenoid 616 is deactivated, top assembly 617 removes pressure from the wire which is being pushed into indents 611 of center assembly 603 by teeth 610.

With respect to the operation of the apparatus of FIG. 2, the solenoids of gripper 600 function in the following manner. After the bottom 24 wires of the 16 wires in the two columns have been attached to the first connector, solenoids 601 and 605 are deactivated releasing pressure on these bottom 24 wires. However, solenoids 616 and 619 remain activated so that the top wire in each column is gripped by gripper 600 while platform 206 is moved back to point 208 of FIG. 2. The top wire of each column is not attached to the first connector, and these wires are not pulled through module 203 of FIG. 2 during this phase of the operation. In the next phase of the operation, all of the solenoids are activated so that all wires are held when platform 206 is moved from point 208 back to point 207. After all wires are attached to the second connector, all solenoids are deactivated so that all wires can be pulled through the tubes of module 203 during the movement of platform 206 back to point 208 from point 207.

Figure 8:
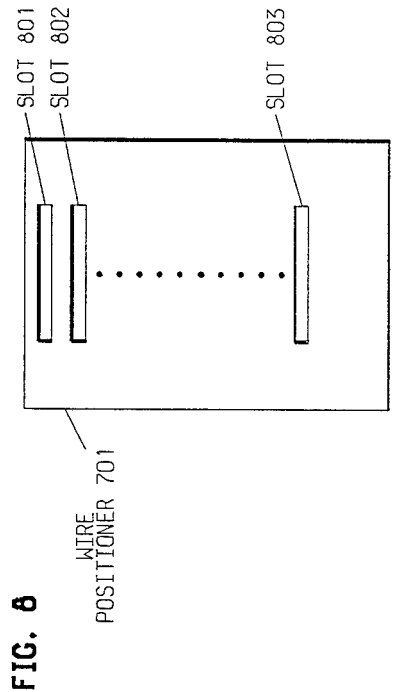
FIG. 8 illustrates a front view of a wire positioner

FIG. 7 illustrates a partial top view of gripper 600 and positioner 701. The solenoids and guides of gripper 600 are not illustrated, and wire positioner 701 is introduced. A front view of wire positioner 701 is illustrated in FIG. 8. Wire positioner 701 has one slot for each pair of wire in the two columns of wires. These slots are designated slots 801 and 802 through slot 803 in FIG. 8. Advantageously, the slots are each approximately 0.1 centimeter in height and approximately 1.9 centimeters wide for 26 gauge wire. Each slot corresponds to a horizontal set of teeth and indent pairs of gripper 600. When wire is initially threaded through the apparatus illustrated in FIG. 2 from wire reels 204, each wire is threaded through one of the wire straightener tubes of module 203 and through a slot in wire positioner 701 after being placed on one side of center assembly 603 of gripper 600 as illustrated in FIG. 6. Wire positioner 701 provides the vertical alignment of the columns of wire for gripper 600. Wire positioner 701 also provides the correct vertical alignment and approximate horizontal alignment for connector mechanism 201 of FIG. 2. Connector mechanism 201 provides the final horizontal alignment before attaching each wire to the connector.

Figure 9:
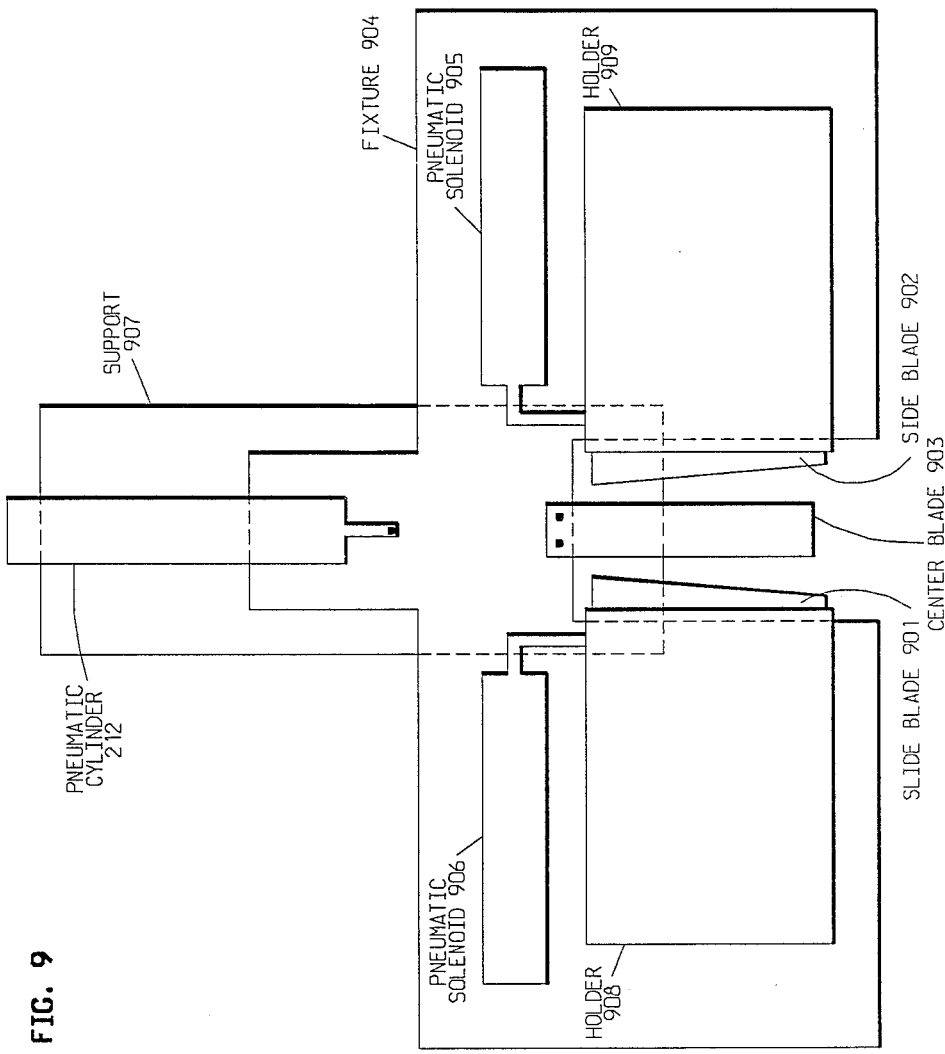
FIG. 9 illustrates a cutter mechanism for cutting wire.

Cutter mechanism 211 and pneumatic cylinder 212 are illustrated in greater detail in FIG. 9. Pneumatic cylinder 212 is rigidly mounted to support 907. Support 907 is rigidly mounted to supports for the apparatus illustrated in FIG. 2. Fixture 904 moves on guides that are attached to support 907 but are not illustrated in FIG. 9. These guides are between fixture 904 and support 907. One skilled in the art could readily devise such guides. Fixture 904 is free to move up and down in the vertical direction under control of pneumatic cylinder 212. Pneumatic solenoids 905 and 906 are rigidly mounted to fixture 904 and control the movement of holders 909 and 908, respectively. These holders are free to move in the horizontal direction and their movement is controlled by guides which are attached to fixture 904. These guides are not illustrated but they are beneath holders 908 and 909, and one skilled in the art could readily devise such guides. Center blade 903 is rigidly attached to fixture 904. Side blades 901 and 902 are rigidly attached to holders 908 and 909, respectively. Side blades 902 and 901 are positioned such that they are not in direct alignment with center blade 903 and are free to move over center blade 903.

During operation of cutter mechanism 211, pneumatic cylinder 212 lowers fixture 904 down so that the two column of wires are on either side of center blade 903. Solenoids 905 and 906 are activated so that side blades 902 and 901 are pushed towards center blade 903, and the blades pass over center blade 903 cutting the wires. After the wires have been cut, solenoids 905 and 906 are deactivated moving blades 902 and 901 away from center blade 903, and pneumatic cylinder 212 raises fixture 904.

It is to be understood that the above-described embodiment is merely illustrative of the principles of the invention and that other arrangements may be devised by those skilled in the art without departing from the spirit and scope of the invention. In particular, one skilled in the art could readily apply the principles of this invention to tubing or filaments such as an optical fiber or thread. In addition, one skilled in the art could readily apply these principles to non-circular members.

We claim:

1. An apparatus for straightening an elongated member, comprising:
    a continuous tube having a bend extending entirely in a first plane and having a bend extending entirely in a second plane perpendicular to said first plane; and
    a mechanism for transferring said member through said tube whereby said member is bent in said first plane and then bent in said second plane.

2. The apparatus of claim 1 wherein said transferring mechanism comprises a mechanism for securing one end of said member; and
    a mechanism for moving said tube away from said securing mechanism thereby transferring said member through said tube.

3. Apparatus for straightening a plurality of wires, comprising:
    a housing having a plurality of continuous channels with each of said channels being adapted for having an individual wire threaded through each of said channels; and
    each of said channels having a bend in a first plane and having a bend in a second plane perpendicular to said first plane; and
    a mechanism for transferring said wires through said channels whereby said wires are bent in said first plane and then bent in said second plane.

4. The apparatus of said claim 3 wherein said channels are individual tubes secured in said housing.

5. The apparatus of claim 4 wherein said transferring mechanism comprises a mechanism for connectorizing one end of said wires; and
    a mechanism for moving said housing away from said connectorizing mechanism whereby said wires are pulled through said tubes.

6. The apparatus of claim 5 wherein said wires are continuously fed from reels of wire and said apparatus further comprises a mechanism for gripping all of said wires upon actuation; and
    said moving mechanism further moving said gripping mechanism and said housing together to said connectorizing mechanism, whereby said wires are pulled from said reels of wire.

7. The apparatus of claim 6 wherein said gripping mechanism comprises a plurality of teeth and indents with one pair of teeth and one pair of indents corresponding to each wire whereby upon actuation of said gripping mechanism, each pair of teeth force the corresponding wire into the pair of indents.

8. The apparatus of claim 7 wherein said gripping mechanism further comprises groups of said plurality of teeth attached to separate assemblies with each assembly being independently actuated to grip wires whereby said gripping mechanism can selectively grip groups of wires.

9. The apparatus of claim 8 wherein each of said assembly is actuated by an individual air solenoid.

10. The apparatus of claim 8 further comprises a wire positioner for positioning said plurality of wires; and
    said moving mechanism further moving said wire positioner along with said gripping mechanism and said housing.

11. The apparatus of claim 10 wherein said wires are first threaded through said tubes of said housing, then through said gripping mechanism, and finally through said wire positioner.

12. A method for straightening a plurality of wires using a housing having a plurality of channels with each of said channels being adapted for having an individual wire threaded through each of said channels and each of said channels having a bend in a first plane and having a bend in a second plane perpendicular to said first plane, said method comprising the steps of:
    transferring said wires through said channels; and
    bending said wires in said first plane and then bending said wires in said second plane as said wires are transferred through said channels.

13. The method of said claim 12 wherein said channels are individual tubes secured in said housing.

14. The method of claim 13 wherein said transferring step comprises the steps of connectorizing one end of said wires with a connectorizing mechanism; and
    moving said housing away from said connectorizing mechanism whereby said wires are pulled through said tubes.

15. The method of claim 14 wherein said wires are continuously fed from reels of wire and said method further comprises the step of gripping all of said wires by a gripping mechanism upon actuation; and
    moving said gripping mechanism and said housing together to said connectorizing mechanism, whereby said wires are pulled from said reels of wire.

16. The method of claim 15 wherein said gripping mechanism comprises a plurality of teeth and indents with one pair of teeth and one pair of indents corresponding to each wire, and said gripping step comprises the step of forcing the corresponding wire into the pair of indents by the pair of teeth upon actuation of said gripping mechanism.

17. The method of claim 16 wherein said gripping mechanism further comprises groups of said plurality of teeth attached to separate assemblies, and said gripping step further comprises independently actuating each assembly to selectively grip groups of wires.

18. The method of claim 17 further comprises the step of positioning said plurality of wires with a wire positioner; and said moving step further moving said wire positioner along with said gripping mechanism and said housing.

19. The method of claim 18 further comprises the step of threading said wires first through said tubes of said housing, then through said gripping mechanism, and finally through said wire positioner.

* * * * *